Oct. 2, 1945.   M. NORKIN ET AL   2,385,836
APPARATUS AND METHOD FOR MANUFACTURING SLIDE FASTENERS
Filed Nov. 5, 1942   7 Sheets-Sheet 1

Fig. 1.

INVENTORS
MORRIS NORKIN
ABRAHAM SAVITZKY
BY
ATTORNEY

Oct. 2, 1945.  M. NORKIN ET AL  2,385,836
APPARATUS AND METHOD FOR MANUFACTURING SLIDE FASTENERS
Filed Nov. 5, 1942  7 Sheets-Sheet 5

INVENTORS
MORRIS NORKIN
ABRAHAM SAVITZKY
BY
ATTORNEY

Patented Oct. 2, 1945

2,385,836

UNITED STATES PATENT OFFICE 2,385,836

APPARATUS AND METHOD FOR MANUFACTURING SLIDE FASTENERS

Morris Norkin and Abraham Savitzky,
New York, N. Y.

Application November 5, 1942, Serial No. 464,676

28 Claims. (Cl. 153—1)

This invention relates to an apparatus and method for manufacturing slide fasteners. More particularly the invention is concerned with an apparatus for severing slide fastener elements from a specially formed strip and attaching the elements to a tape.

One of the objects of the invention is to provide an apparatus of the character described whose parts are so proportioned and arranged that it is capable of continuous operation at higher speeds than have heretofore been attained.

Another object of the invention is to provide an apparatus of the character described wherein the high speed reciprocating parts and unbalanced rotating parts are few in number, have small radii of gyration, and are of low weight so that the magnitude of the vibratory stresses induced by these parts is held to a minimum, the life of the apparatus prolonged, and the noise attending the operation thereof greatly reduced.

Another object of the invention is to provide an apparatus wherein the parts are so proportioned and arranged that elements, such as cutting dies and clamps, which wear rapidly and must frequently be replaced, are readily accessible for sharpening and can be removed and replaced without disturbing the precise alignment of parts necessary in an apparatus which operates with great accuracy and at extremely high speed on very small elements.

Another object of the invention is to provide an apparatus of the character described in which the rapidly wearing parts are so arranged and supported that after they are dulled and have been resharpened and reshaped, they may be reset in the apparatus and easily adjusted to restore their operative portions to proper working positions.

A further object of the invention is to provide an apparatus of the character described wherein the parts which are subjected to the greatest wear are so designed that they may be sharpened over and over again before they need be replaced.

Still another object of the invention is to provide an apparatus of the character described having an improved clamping means which is so constructed and arranged and whose movement is so synchronized with the movement of the cutting die that, although the formed strip fed into the apparatus has nonserrated edges, the sides of the slider elements, after attachment on the tape, are straight and parallel to the web of the tape and the ends of the elements are substantially normal to the web of the tape.

Another object of the invention is to provide an apparatus of the character described wherein the clamping means will smooth and round the edges of the individual slide fastener elements and remove any burrs or irregularities resulting from shearing the elements from the specially formed strip.

Another object of the invention is to provide an apparatus of the character described having an improved means for feeding the specially formed strip which, although it operates during the periods no elements are attached to the tape, does not mutilate the strip.

A further object of the invention is to provide an apparatus of the character described comprising relatively few and simple parts, which is rugged and efficient in operation, economical to manufacture and employ, and is highly practical and effective for the purposes set forth.

Other objects of the invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention.

The apparatus illustrated in the drawings is adapted to be used with a metallic strip S (see Fig. 12) to which a rectangular cross section has been imparted in a previous operation, such, for example, as rolling, and which strip has a longitudinal series of projections P (Fig. 10), on its upper surface and a corresponding series of depressions D on its lower surface. The projections and depressions are in registry, and successive projections are closely spaced so that the strip in longitudinal central section has a serrated profile. Successive projections are spaced apart a distance equal to the spacing desired between the head of a finished slide fastener element and the bead B (Fig. 12) of a slide fastener tape T. The longitudinal edges L of the strip are straight as contrasted with the serrated edges of some of the strips used in manufacturing slide fasteners now on the market.

The apparatus of the present invention is adapted to successively sever the foremost projections and underlying depressions together with material to either side of such projections and depressions, which material is so shaped that when properly manipulated it will form jaws which can be tightly pressed against the bead of the tape with the tips thereof embedded in the web of the tape. The apparatus is provided with clamping means for thus manipulating the severed elements and also has means for properly spacing the elements along the tape. Ancillary means, such as means for feeding the slider strip, and means for spacing groups of attached sliders along the tape are also provided.

Heretofore when severing elements from formed straight-edged strips of the character described in machines which both sever and attach the elements to the tape, the ends of the element jaws have been angularly inclined to the web of the tape. These angularly disposed ends frequently caught between the flanges extending from the wings of slide fastener sliders and either caused said sliders to jam or the wings thereof to spread apart. Additionally the head ends tapered thus limiting the interlocking area and detracting from the appearance of the slide fastener.

To overcome this difficulty, in the present apparatus, novel clamping means have been provided which is so constructed and whose operation is so timed in synchronization with the operation of the element severing means that, not only are the sides of the element jaws and heads linear and parallel to each other and to the web of the tape, but the tips of the element jaws are arranged substantially at right angles to the tape so that there is no tendency to jam or dislocate the sliders used therewith.

It will be apparent that in strips of the type above described wherein no scrap material is disposed between successive heads, and wherein the material of the strip lying to both sides of the head and along the longitudinal edges of the strip is wholly fashioned into jaws, the side edges of the severed slide fastener elements are necessarily uneven and the upper corners of these edges may be jagged. Wire brushing of the completed slider stringers has therefore been necessary to remove such unevenness. This operation however, entails additional expense, soils the slider tape and does not remove all the burrs. In the present apparatus it will be seen that these irregularities in the slide fastener elements are removed during application of said elements to the tape by so fashioning the clamping means which cause the elements to engage the tape that the exposed side edges of the jaws are rounded into a smooth and finished contour.

Figure 2:
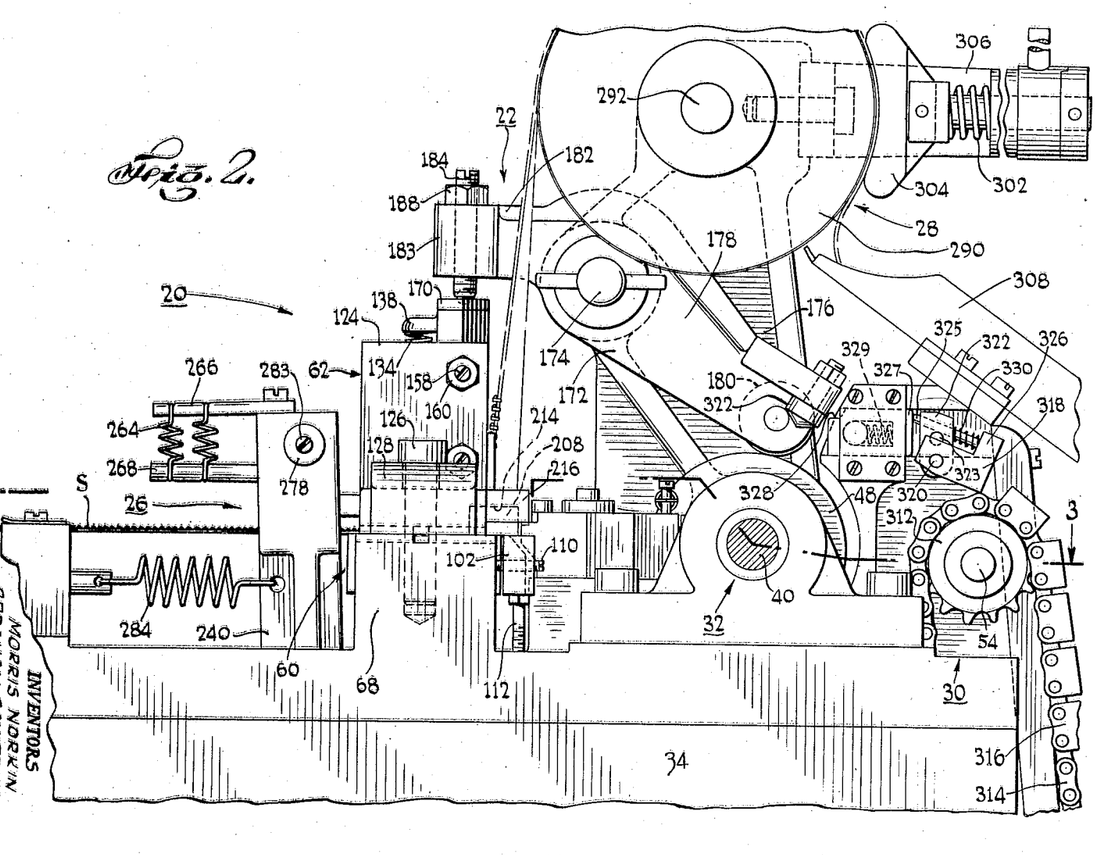
Fig. 2 is a fragmentary side elevational view thereof in partial section.

Referring now to the drawings, 20 denotes a slide fastener attaching apparatus embodying the invention and basically including a means 22 (Fig. 2) for successively severing the foremost heads and associated jaw material from the strip S; a means 24 (Fig. 7) for clamping the severed slide fastener elements on the tape; a means 26 for intermittently feeding the strip; a means 28 for intermittently advancing the tape; a means 30 for spacing groups of slide fastener elements along the tape; and a means 32 for operating all of the foregoing means in properly timed relationship.

The apparatus 20 is mounted upon a cast iron bed 34 provided with suitable supporting legs (not shown) and has a configuration, later described in detail, suitable to support the various operative means in proper working position.

Figure 1:
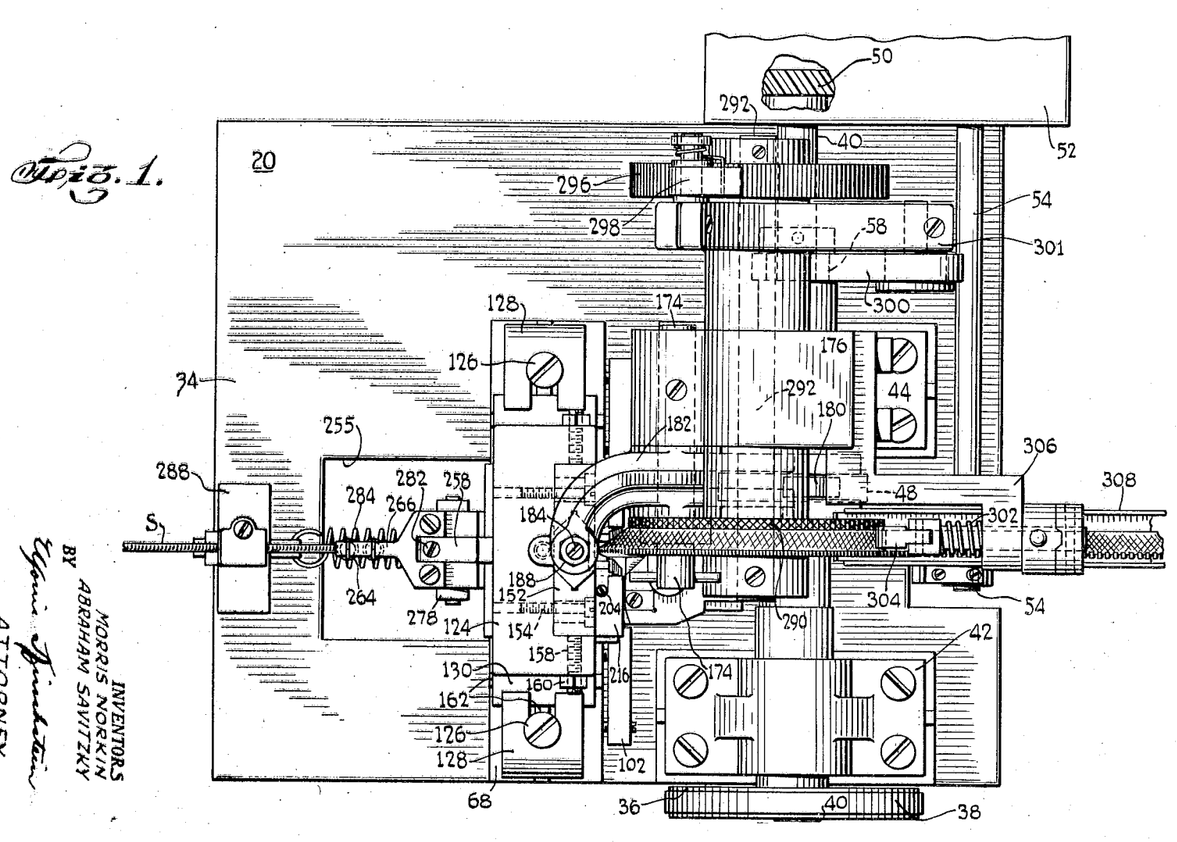
Fig. 1 is a top plan view of an apparatus embodying the invention.

The apparatus is powered by an electric motor (not shown), mounted below the bed of the machine in any well known manner, which drives a sheave 36 (Fig. 1) through a V-belt 38. Said sheave 36 rotates with the main drive shaft 40 (Figs. 1–4) which forms a main element of the means 32 for operating the various material working and engaging means 22—30 in properly timed relationship. The shaft 40 is journalled in a pair of spaced bearing boxes 42, 44 bolted to the bed 34 of the apparatus. Fixed on said shaft is a double, side-face cam 46 (Fig. 3–4) for actuating the clamping means 24, a profile cam 48 for actuating the severing means 22, an input gear 50 (Fig. 1) of a train 52 for driving an auxiliary drive shaft 54 which actuates the spacing means 30, a profile cam 56 for actuating the strip feeding means 26, and, lastly, an eccentric 58 (Fig. 1) for actuating the tape feeding means 28.

Figures 6, 8:
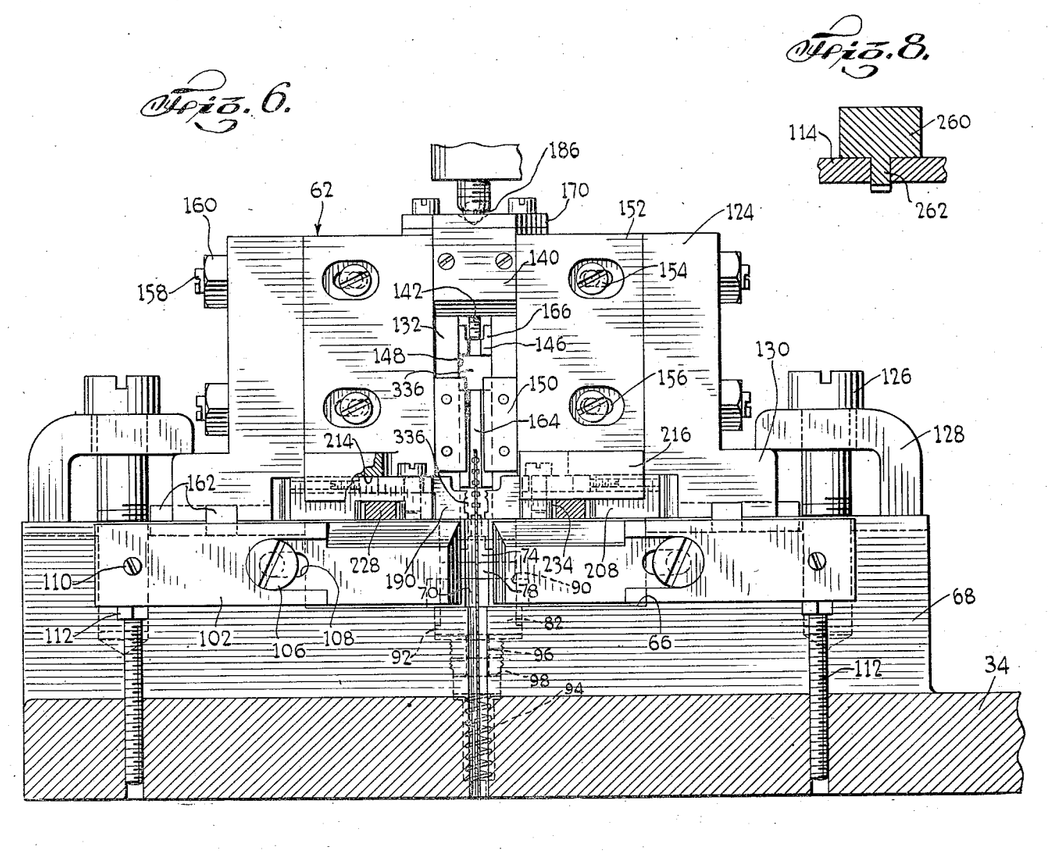
Fig. 6 is a sectional view taken substantially along the line 6—6 of Fig. 3 and shows the front face of the removable housing in which the reciprocating shearing and clamping dies are supported.
Fig. 8 is an enlarged transverse sectional view through the feed finger and shows the means for supporting the same for reciprocation in a fixed plane.

The severing means 22 essentially comprises a removably attached housing 60 (Figs. 3, 4 and 7), for supporting a stationary anvil, later described, a removably attached housing 62 (Figs. 2, 4 and 6) for supporting a reciprocating shearing die and clamps, and a linkage system for operating the reciprocating die from the profile cam 48.

Figures 7, 9, 10:
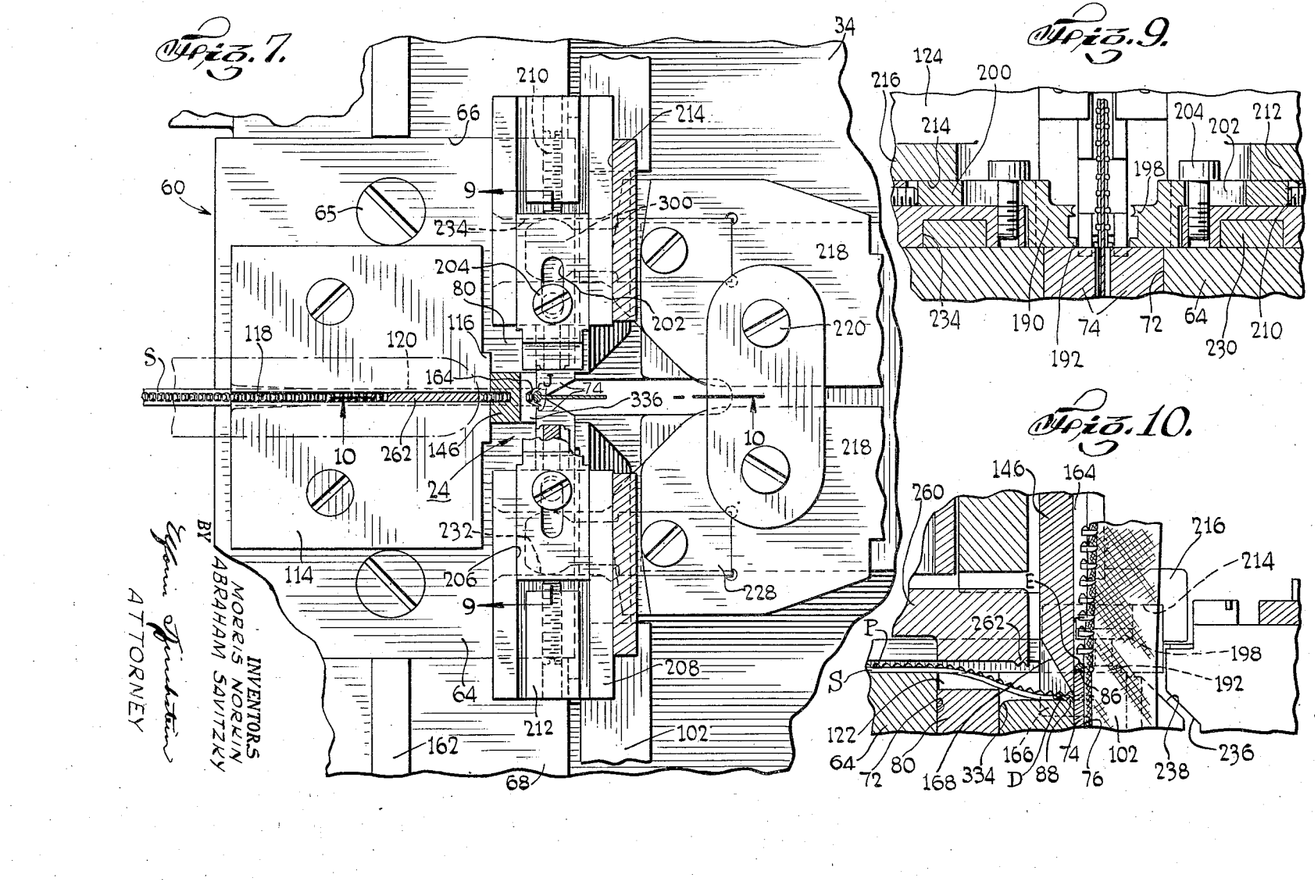
Fig. 7 is an enlarged sectional view taken substantially along the line 7—7 of Fig. 4.
Fig. 9 is an enlarged sectional view taken substantially along the line 9—9 of Fig. 7 and shows the reciprocating clamping dies at the end of their return stroke.
Fig. 10 is an enlarged sectional view taken substantially along the line 10—10 of Fig. 7 and shows the shearing die in fully depressed position.
Figure 11:
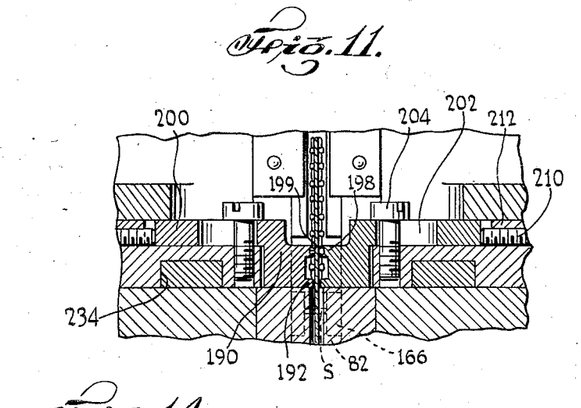
Fig. 11 is a view similar to Fig. 9, but shows the reciprocating clamping dies at the end of their operative stroke.

The housing 60 for the stationary anvil includes a steel casing block 64 (Figs. 3, 4 and 7), which is received in a recess 66 (Figs. 6 and 7) in a ridge 68 integrally formed on the upper surface of the bed 34 and held to said ridge by bolts 65. Said casing block is supported on a hardened steel base plate 70 (Figs. 4 and 6) having the same general contour, in plan, as the block 64. The forward portion of said casing block is centrally and deeply recessed vertically from top to bottom, as at 72 (Figs. 3, 9, and 10) to accommodate a plurality of parts for supporting and positioning a shearing anvil 74 (Fig. 7). Said shearing anvil has its front face flush with the front face of the block 64 (see Fig. 2) and is centrally and vertically recessed to pass the web of the tape T. The walls of the central recess taper rearwardly to a constricted neck and then abruptly enlarge to provide roughly circular bore 76 (Fig. 10) through which the bead of the tape can freely slide. Said recess and bore combine to form a keyhole slot, best illustrated in Fig. 3. The upper half of the bore 76 is of substantially uniform diameter to permit the anvil to be ground down after it has become worn during use without varying the size of the bore. The lower half of the bore is flared to facilitate passage of the tape bead therethrough.

The anvil 74 is supported by a pair of hardened steel vertical spacing blocks 78 (Figs. 4 and 6) whose contours are similar to the contour of the portions of the anvil lying to either side of the bore 76. In accordance with our invention, we provide a plurality of pairs of such blocks 78 of different heights, and grind down the surface of the anvil 74, each time that the anvil has to be resharpened, by an amount equal to the difference between the heights of successive pairs of blocks. In this manner, the overall height of the ground anvil and blocks remains constant. The lower faces of the blocks 78 bear upon the forward portion of the hardened steel plate 70, whereby the load placed upon the anvil 74 during a severing operation is distributed over the wide base of said plate 70 contacting the softer cast iron bed 34. The aforesaid construction prevents the anvil from sinking into the cast iron bed and impairing the delicate timing of the various operative means.

The anvil 74 is backed up by the two legs of a U-shaped, hardened, horizontal steel block 80 (Figs. 7 and 12) set in the forward recess 72 of the casing block 64. Between said legs there is disposed a floating pad 82 (Figs. 3 and 4) whose forward face is recessed to snugly receive a vertically elongated projection on the rear face of the anvil 74 behind the bore 76. The lateral edges of the floating pad are set back to provide, in conjunction with the legs of the U-shaped block 80, recesses 84 to either side of the central portion of said pad.

Both the rearward projection of the anvil 74 and the adjacent central portion of the floating pad 82 have teats 86, 88 (Fig. 6) formed on their upper faces. These teats are spaced apart a distance equal to the space between two successive depressions D on the under face of the formed strip S, and said teats are preferably contoured so as to snugly fit into the depressions to thereby serve as pilots for exactly positioning the formed strip immediately prior to a severing operation. Either of these teats may be omitted. When both are used they serve to doubly check the position of the strip.

The lower end of the floating pad 82, which freely passes through an aperture 90 (Fig. 4) in the base plate 70, has a pair of ears 92 (Fig. 6) extending laterally of said aperture, said ears being so arranged that when they butt against the lower face of the base plate the uppermost surface of said pad will be flush with the top face of the shearing anvil. A spring 94 housed in a recess 95 in the bed 34 urges a pin 96 on a plunger 98 against the bottom of the pad 82 to bias said pad to its uppermost position. A plug 100, threaded into a tapped portion at the enlarged top 101 of the recess 95, limits the upward motion of the plunger so that when the floating pad is in its uppermost position no biasing force is impressed thereon.

The anvil 74, vertical spacing blocks 78, pad 82, and horizontal spacing block 80 are all retained in the recess 72 of the casing block 64 by means of a pair of horizontal clamping strips 102 (Figs. 2, 3, and 6) which are maintained slightly spaced away from the front face of the ridge 68 and have a pair of vertical fingers 104 (Fig. 3) abutted against spaced points on the anvil 74 and blocks 78 on both sides of the bore 76. Said strips 102 are secured to the ridge 68 by bolts 106 threadedly received in said ridge and freely passing through horizontal slots 108 in the strips. These slots permit adjustment of the fingers so that they may rest upon any desired portion of the anvil 74. Screws 110 threaded through tapped apertures at the outer ends of the strips 102 press against the forward face of the ridge 68 to pivot the strips about the heads of the bolts 106 and thus urge the fingers 104 against the anvil. The horizontal disposition of the strips is adjusted by screws 112 threaded into the base 34 and whose heads rest on the under surfaces of the strips.

The clamping strips 102 prevent horizontal movement of the parts disposed in the casing block 64. To prevent vertical movement of the U-shaped spacer 80 supported in said block, a pair of plates 114 (Figs. 4 and 7) are employed. These plates are superimposed on the casing block 64 and have coplanar finger portions 116 overlying the legs of the U-shaped spacing block 80. Said plates are bolted to the casing block 64 and thus press the spacing block 80 firmly against the base plate 70. The juxtaposed edges of the plates 114 are slightly spaced apart to provide a slit 118 disposed normal to the drive shaft 40. In order to accommodate the formed strip S, the undersurfaces of said plates 114 adjacent the slit 118 are undercut, as at 120, enough to permit unrestricted passage of said strip. It will be noted that the forward portions of said undercuts near the anvil 74 are just large enough to permit the strip S to clear but that the rear portions of the undercuts are flared to gradually quiet chattering of the strip without marring the latter or causing undue vibration of the plates.

The central portion of the U-shaped horizontal spacing block is cut away in registry with the line of travel of said strip to form a recess 122 (Fig. 10) in which the strip may be accommodated when it is depressed during a severing operation.

Figure 3:
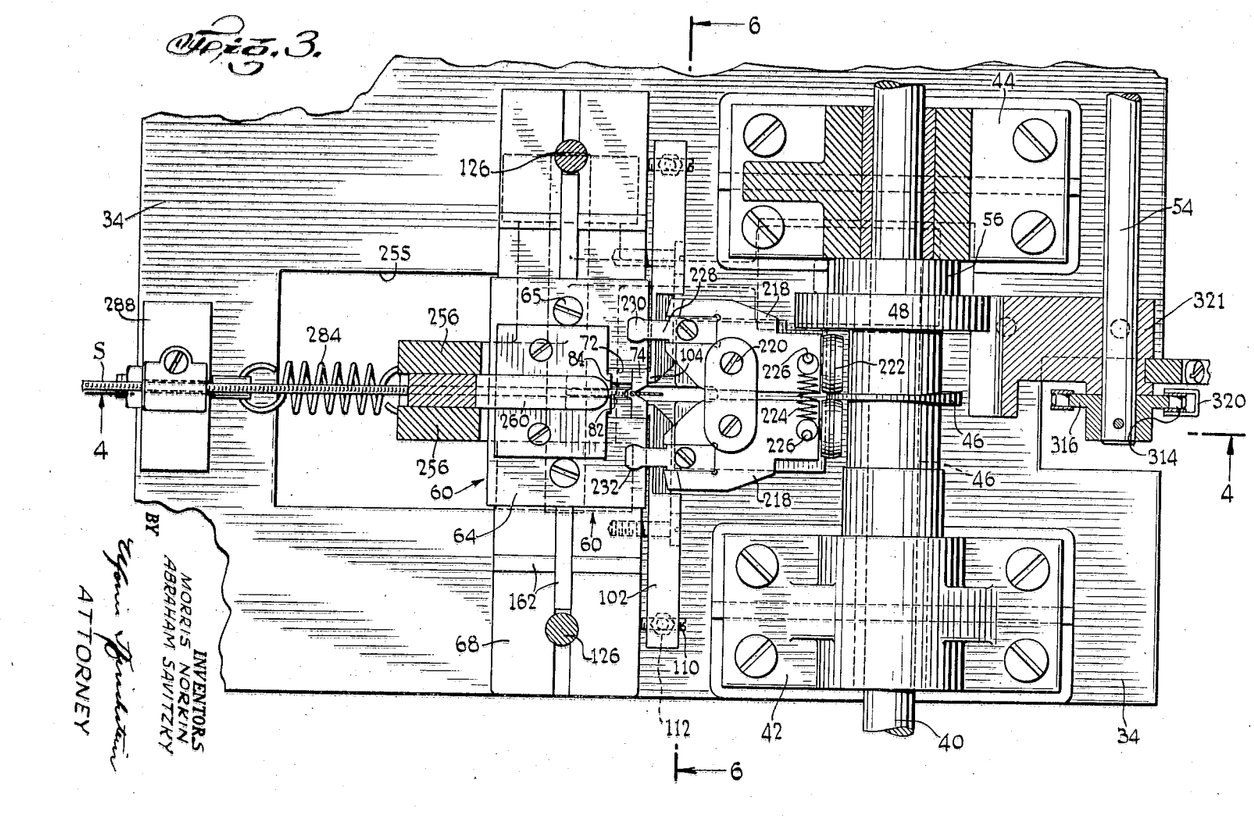
Fig. 3 is a sectional view taken substantially along the line 3—3 of Fig. 2 but with the housing, which supports the reciprocating shearing and clamping dies, removed.
Figures 4, 5:
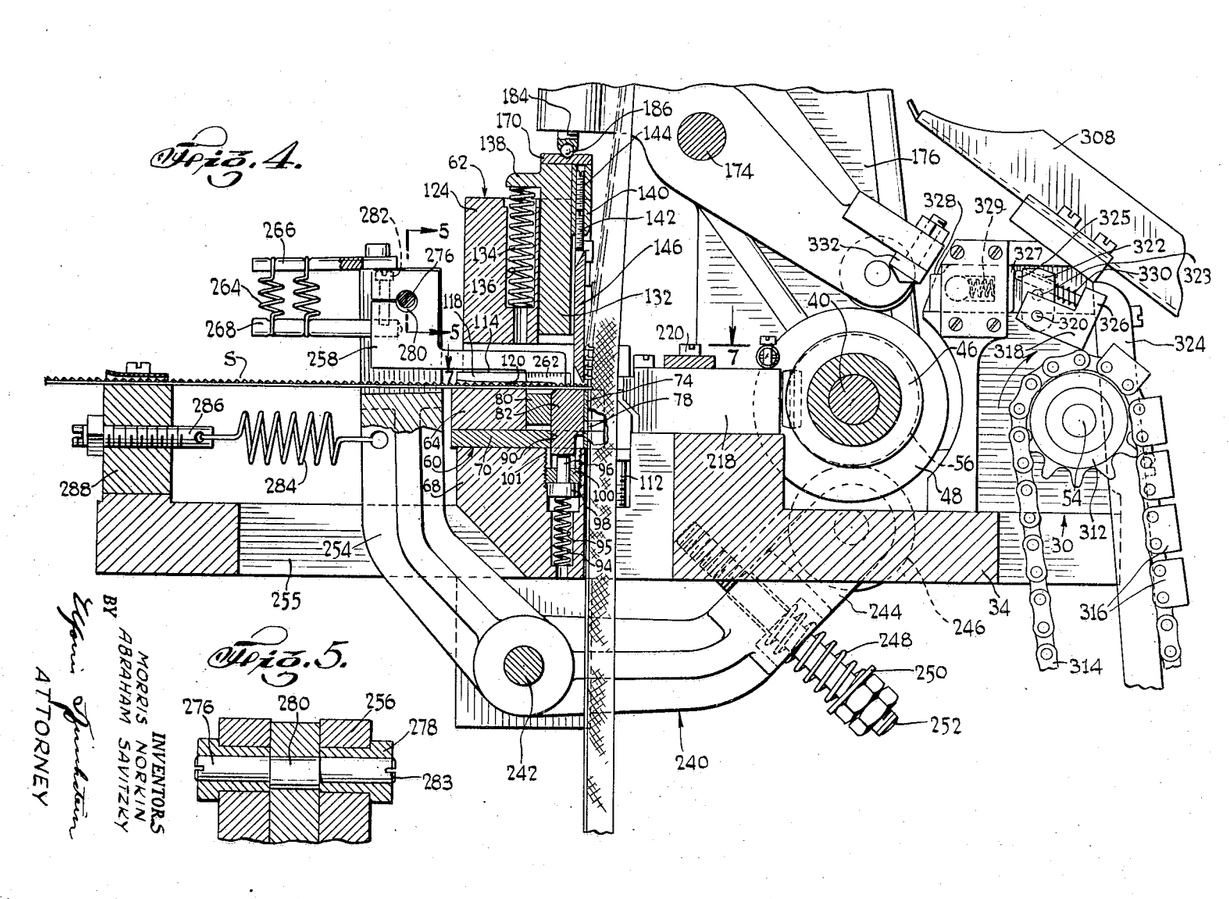
Fig. 4 is a sectional view taken substantially along the line 4—4 of Fig. 3.
Fig. 5 is an enlarged sectional view taken along the line 5—5 of Fig. 4 and illustrates the construction of the means for adjusting the position of the feed finger.

It will be appreciated that by virtue of the foregoing construction when the housing 62 which contains the reciprocating shearing die and clamps is removed from the apparatus and leaves the anvil housing 60 exposed, as shown in Fig. 3, that said anvil may easily be removed for grinding, and replaced after it has been so sharpened, without readjusting the anvil for either alignment or timing.

The housing 62 for the reciprocating shearing die and clamps, comprises a casing block 124 (Figs. 1, 2, 4, and 6) which is held on the ridge 68 over the anvil housing 60 by bolts 126 and right angle clamps 128 cooperating with a pair of casing ears 130 to removably retain said block in position. Slidably supported in said block is a crosshead 132 which is biased upwardly by a spring 134 held in compression between the bottom of a recess 136 in the casing block 124 and a rearwardly extending lug 138 on the crosshead. A plate 140, bolted in a recess in the upper front face of said crosshead 132, is used to support an adjusting screw 142 which is threadedly received in a tapped aperture in said plate and which projects well below the bottom edge thereof. A second screw 144, accessible from the top of the threaded aperture in said plate 140, locks the adjusting screw 142 in position. The adjusting screw butts against the top of a shearing die 146 lying in a vertical channel 148 in the front face of the crosshead 132. After the position of the shearing die 146 has been adjusted to obtain the desired timing, later to be described, it is locked by a pair of clamp plates 150 which are bolted to the crosshead.

The crosshead slides between a pair of ways 152 held to the casing block 124 by bolts 154 which pass through horizontal slots 156 in said ways. The ways are laterally adjusted by screws 158 and locked in position by nuts 160. The ways are so set that, when the casing block 124 is clamped on the ridge 68, the shearing die will be properly lined up over the anvil 74. Such construction obviates readjustment of the relative position of the parts when the shearing die 146 is repositioned after grinding. To permanently define the relative position of the housings 60, 62, a plurality of keys 162, arranged in various angular positions, are provided on the upper face of the ridge 68. Said keys are adapted to be received in corresponding key ways in the casing block 124.

The front face of the shearing die 146 is shaped to negatively match the contour of the rear face of the anvil 74. To this end a vertical V-shaped channel 164 (Fig. 7) is formed in said die. The ends of the die have posts 166 projecting therefrom which are adapted to be received in the recesses 84 in the anvil housing 60 in order to pilot the die during severing. The cutting edge of said die may be relieved as at 168 (Fig. 10) for the die to clear the projections P on the strip immediately in back of the foremost slide fastener element E (Fig. 10) being severed from the front end of said strip. It will be noted (Fig. 6) that both ends of the die are shaped for coaction with the anvil 74 so that after one end has been considerably worn down after several grindings, the die can be reversed, end-for-end, and the other end employed.

The top of the crosshead 132 is covered by a hardened steel impact plate 170 which cooperates with a ram linkage system for driving the reciprocating die from the cam 48. Said linkage system comprises a bell crank lever 172 pivoted on a pin 174 supported on a standard 176 mounted on the bearing 44 for the drive shaft 40. Said lever 172 has a driven arm 178 on which there is journalled a roller 180 adapted to ride on the profile cam 48. The lever 172 also has a ram arm 182 laterally offset from the driven arm 178. On the head 183 of this ram arm a heavy driving bolt 184 is threadably received. The tip of said bolt rotatably carries a hardened steel impact ball 186 in vertical alignment with the shearing die 146. A nut 188 locks the bolt 184 in any adjusted position. The threads of the bolt 184 have a considerably larger pitch than the threads of the screw 142 so that coarse adjustment of the shearing die is afforded by the bolt 184 and fine adjustment thereof by the screw 142.

It should be particularly noted that the ram linkage system includes only a single driving lever arm, thus greatly reducing the weight of the rapidly moving system and permitting the same to operate at higher speeds. In addition, the use of the single driving arm permits manual access to the shearing anvil without first disassembling said linkage system. This appreciably facilitates replacement and repair of the anvil 74.

Figure 12:
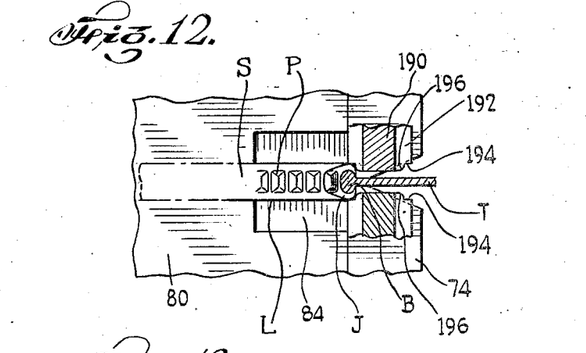
Fig. 12 is an enlarged fragmentary sectional view of the lower clamping dies at an intermediate stage of operation.
Figures 13, 14:
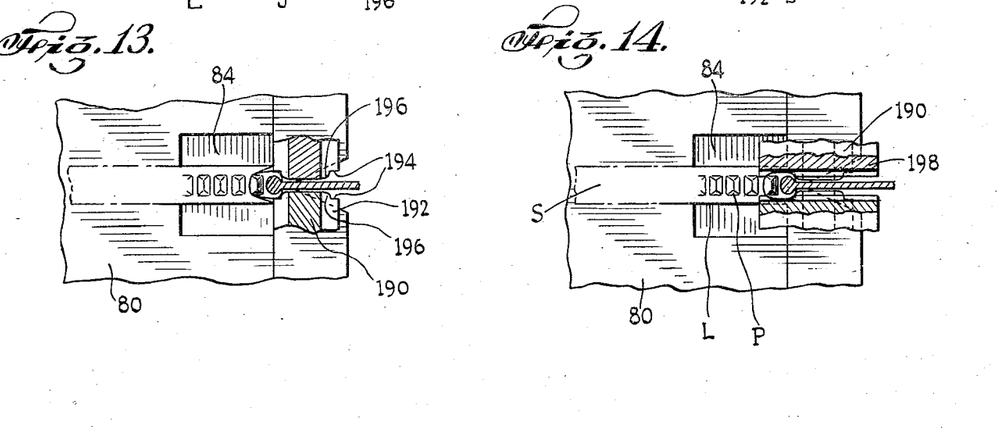
Fig. 13 is a view similar to Fig. 12 but shows the lower clamping dies at their final stage of operation.
Fig. 14 is a fragmentary sectional view of the upper clamping dies at their final stage of operation.

The means 24 for clamping elements E severed from the end of the strip S comprises a pair of clamping blades 190 (Figs. 6, 7, 9, 11, 12, 13, and 14). Said blades each have a lower clamping flange 192 (Figs. 11, 12 and 13) disposed in the feeding plane of the strip S. The corners of these flanges 192 are cut away, as indicated in Figs. 12 and 13, to provide flats 194 set back from convex corners 196. Said corners are so disposed relative to the foremost element E being severed that when the clamping blades 190 are moved towards each other the corners will strike the tips of the jaws J (Fig. 7) extending from said element and arrange said tips at an angle of approximately 90° to the remaining portions of the jaws (Fig. 12). The tips in this position face towards the web of the tape T and partially embrace the bead B. The flats 194 are so disposed that, after the convex corners have performed this operation, said flats will engage the outer surface of the slider element being severed in back of the tips and drive the jaws inwardly toward the tape web causing the points of the jaws to become embedded in said web and the jaws to be lightly clamped against the tape bead B. Said jaws however, are not driven far enough for satisfactory operation of a slide fastener due to the fact that the flats 194 only operate on the lower extremity of the slider elements, and if they are permitted to press too heavily against these small areas the element will become distorted.

To finish the clamping action without mutilating the slide fastener elements, there is provided on the blades 190 a second set of clamping means comprising flanges 198 (Figs. 11 and 14) disposed above the flanges 192 a distance equal to an even multiple of the distance between successive slide fastener elements on the tape T. We have found that where this spacing equals the distance between three such elements satisfactory results are obtained. The surfaces of said flanges 198 facing the slide fastener tape are grooved as at 199 (Fig. 11), the bottom of the groove being substantially flat and the side walls thereof being sharply angularly inclined to said bottom wall and connected therewith by a fillet of generous radius. The base of said groove and fillets are so proportioned that when the clamping blades 190 move towards each other the fillets will engage the corners of the slide fastener jaws and round the same to the desired degree. The pressure exerted by the fillets and bases of the grooves will remove any unevenness and roughness on the slider jaws arising during shearing. It will be noted (Fig. 14) that the curved flanges act upon substantially the full length of the slide fastener elements, as contrasted with the relatively small portions of the slide fastener element on which the flats 194 operate.

Both sides of the flanges 192 and 198 are similarly formed so that the blades 190 can be reversed to present a fresh side when one side is so badly worn that it can not be reground.

In accordance with our invention, the clamping blades 190 are supported for relative reciprocation in the housing 62 which also carries the shearing die, so that when this housing is removed, after taking off the clamping angles 128, said blades will be removed therewith as a unitary part of the housing. To this end, each of the clamping blades is provided with an ear 200 (Figs. 7 and 9) having an elongated slot 202 therein. Bolts 204 passing through the slots 202 clamp the ears 200 in the channels 206 of crossheads 208. The blades 190 are adjusted relative to the crossheads by screws 210 threadably received in tapped apertures of blocks 212 fixed in the channels of the crossheads. It will be understood that the bolts 204 are loosened during adjustment of the clamping blades. The crossheads are snugly received in grooves 214 (Figs. 6 and 9) formed on the undersurface of two laterally extending flanges 216 adjacent the base of the housing 124. The sliding fit between the crossheads 208 and grooves 214 is so snug that when the housing 124 is removed the crossheads and clamping blades will move with said casing.

Suitable means is provided for reciprocating the crossheads 208 towards and away from each other. In accordance with the invention, said means is so constructed that the operative connection between it and said crossheads may be broken simply by lifting the housing 62. This greatly facilitates disassembly and assembly of the working parts of the apparatus in order to sharpen or replace the shearing die, clamping blades, or anvil. Said crosshead driving means comprises a pair of stub levers 218 (Figs. 3 and 7) pivoted on pins 220 bolted to the bed plate 34. One set of lever ends has crowned rollers 222 which ride on opposite faces of the double side-face cam 46. The rollers are maintained in engagement with the cam 46 by a spring 224 held under tension between pins 226 on the roller carrying ends of the stub levers 218. The other ends of the levers are channeled to receive fingers 228 having knobby ends 230 whose opposite lateral surfaces 232 are smoothly rounded. Said ends 230 are received in rectangular channels 234 cut in the under surface of the crossheads 208. The channels are sufficiently wide to snugly receive said ends 230 and the latter are so shaped that, as the levers 218 oscillate about the pins 220, the opposite lateral sides 232 thereof will remain in snug engagement with the walls of the channels 234 thus preventing any lost motion or backlash.

It will be appreciated that by transforming the oscillatory movement of the levers 218 into the translatory movement of the crossheads 208 and clamping blades 190, it is possible to force the tips of the jaws of the endmost slide fastener element E on the strip S with a high degree of precision to a position wherein said tips are disposed substantially at right angles to the sides of the jaws.

It will further be appreciated that because of the translatory movement, when the flanges of the clamping blades become worn, they may be removed for regrinding and reinserted in the crossheads without affecting the accuracy with which they inturn the tips of the slide fastener jaws.

The lower corners 236 of the ends of the stub levers 218 facing the housing 60 and the corresponding upper corners 238 of the clamps 102 are beveled (Fig. 10) to permit the lever ends to lie close to the crossheads. This reduces the unsupported length of the fingers 228 and lessens the whip of said parts during high speed operation.

The means 26 for intermittently feeding the strip S includes a bell crank lever 240 (Figs. 2 and 4) pivoted on a pin 242 supported beneath the frame 34. One end 244 of said lever has a roller 246 journalled thereon and disposed in rolling engagement with the strip feeding profile cam 56. This roller is maintained in contact with said cam by a spring 248 held under compression between the lever end 244 and a projecting member such as a washer 250 supported on a bolt 252 screwed into the bed 34. The other end 254 of the bell crank lever freely passes through a slot 255 in the bed and is bifurcated to provide two arms 256 located above the top of the ridge 68.

A feed dog 258 is pivotally mounted on said arms in a manner shortly to be described. Said feed dog includes a feed arm 260 (Figs. 3 and 10) extending horizontally over the strip S in spaced relationship thereto and a narrow feed finger 262 (Figs. 4 and 10), which projects through the slot 118 between the clamping plates 114. The undersurface of the feed finger 262 is serrated at its forward end to negatively match the contour of the upper surface of the strip S, and by engaging the projections P of said strip on its forward stroke, causes a feeding movement thereof. The stroke of the feed finger is, of course, governed by the eccentricity of the profile cam 56. The feed arm 260 is maintained in sliding engagement with the upper surface of the clamping plates 114 by a pair of springs 264 held in tension between two dowels 226, 268 extending rearwardly from the bell crank lever 240 and feed dog 258 respectively. Because of this construction the feed finger 262 constantly reciprocates in a fixed horizontal plane. The purpose of such motion will soon be apparent.

The means for pivotally supporting the feed dog 258 on the bifurcated arms 256 is so constructed that the position of the stroke of the feed finger 262 can be easily adjusted. To this end said means includes a pin 276 (Figs. 4 and 5) journalled in bushings 278 disposed in the arms 256. The center of the pin carries an integrally formed eccentric 280 on which the split end of the feed dog is clamped by a bolt 282. Thus, the pin 276 can be rotated, when the bolt 282 is loosened, by turning its slotted ends 283 thereby to vary the position of the feed finger 262 at the beginning and end of its working stroke. It may be mentioned that the horizontal position of the feed finger is not affected by this adjustment since the spring 264 maintains the feed arm 260 in engagement with the clamping plates 114.

The pressure under which the roller 246 is urged toward the strip feeding profile cam 56 can be adjustably augmented, when the speed of the apparatus is to be increased, by a spring 284 (Figs. 1 and 2) held under tension between the vertical end 254 of the bell crank lever and a bolt 286 threaded in a post 288 on the bed 34.

The means 28 for feeding the tape T is conventional, and comprises a knurled drum 290 (Figs. 1 and 2) mounted on a spindle 292 rotatably journalled in the standard 176 on which the bell crank ram 172 for the shearing die is supported. The spindle has a ratch 296 which is rotated by a ratchet 298. The ratchet, in turn is driven by the tape feeding eccentric 58 on the drive shaft 40 through a pitman 300 and radius rod 301. A spring 302 causes the usual smooth-faced shoe 304 to resiliently press the tape against the knurled surface of the drum 290, said shoe being mounted on a post 306 extending from the standard 176.

The tape, with slide fastener elements attached leaves the apparatus through a chute 308.

Any well known brake or drag mechanism (not shown) is positioned beneath the bed 34 to place the tape under tension between said mechanism and the knurled tape feeding drum 290.

The novel means 30 for spacing groups of slide fastener elements along the tape is actuated by the auxiliary drive shaft 54 and includes a sprocket 312 (Figs. 2, 3, and 4) turned by said shaft and driving a chain 314. A take-up sprocket (not shown) keeps said chain under tension. A few consecutive chain links carry riders 316 which, when they pass around the sprocket 312, are spaced further from the center of said sprocket than are the links of the chain. The upper surfaces of said riders are adapted to engage the elbow of a bell crank lever 318 (Fig. 4) pivotally mounted on a pin 320 which is carried on a fitting 322. Said fitting is in turn pivotally mounted on another pin 323 fixed on a post 324 on the bed 34. The upper end of the fitting 322 is provided with a large bore disposed above the pivot pin 323 in which bore a shaft 325 is slidably supported. The ends of the shaft 325 project from opposite surfaces of said fitting. The rear of said shaft facing the short end 326 of the bell crank lever 318 is abutted thereagainst, and the front of the shaft rests on the rear surface of a block 327 slidably mounted in the post 324. Said block has its forward corner 328 notched and hardened. The block 327 is biased toward the fitting 322 by an internal spring 329. Another spring 330, encircling the rear of the shaft 325, urges the fitting 322 and bell crank 318 pivotally apart about the pin 320.

When the riders are so positioned that they do not contact the bell crank lever 318, the elbow of said lever will engage the surface of the chain 314, where it is urged by the spring 330. At such time the block 326 is maintained at its extreme right hand position (as viewed from Figs. 2 and 4), where the notch 327 in said block will be out of the path of travel of a hardened steel plug 332 carried on the arm 178 of the bell crank ram lever 172 which actuates the reciprocating shearing die 146.

When the riders 316 raise the bell crank lever 318, said lever and the fitting 322 will pivot about the pin 323 forcing the forward end of the shaft 325 against the block 327, to urge said block forwardly to a position wherein the notch 328 will be disposed below the plug 322, slightly beneath the uppermost of the points between which it reciprocates. With the block 327 thus disposed, the die 146 will be held in its lowermost position wherein it maintains the forward end of the strip S depressed and out of engagement with the feed finger 262 so that no elements can be severed from the strip.

It may be mentioned that if at the time the riders 316 engage the bell crank lever and urge the block 327 toward the left, the plug 332 is in its lowermost position, said block will merely press against the plug; but as soon as the block reaches the top of its stroke, it will spring to the left into latching position. This is due to the construction and relative arrangement of the bell crank lever 318, fitting 322, shaft 325, and spring 330. When the bell crank lever 318 is raised at a time that the plug 332 is improperly disposed, the spring 330 will be tensioned and the angular gap between the fitting 322 and bell crank lever 318 be narrowed by rotation about the pin 320. At the same time the pin 320 will revolve clockwise (as viewed from Figs. 2 and 4) about the pin 323. In this position, the forward end of the shaft 325 will be pressed, under the force exerted by the compressed spring 330, against the back of the block 327, and thus maintain said block pressed against the rear of the plug 332 ready to spring rapidly into latching position. The disposition of the notch slightly below the top of the stroke of the plug 332 gives the block 327 time to move into latching position and enables it to shift out of such position when the riders 316 have travelled past and dropped the bell crank lever 318.

While the shearing die is held stationary at the bottom of its operative stroke, it will be apparent that no elements can be severed from the strip. However, during this period the means 28 for moving the tape is continuously actuated so that empty spaces will be provided along the tape between groups of attached slide fastener elements. The length of the emtpy spaces is a function of the number of riders employed and the distance between successive spaces is a function of the length of the chain 314.

The movement and timing of the various means above described will now be described.

The start of the cycle of operations will be arbitrarily taken at the point immediately after the foremost slide fastener element E has been severed, clamped on the tape, and the tape advanced one step. At this point the tape is stationary; the reciprocating shearing die 146 is at the top of its stroke or is descending, but has not reached the top surface of the strip S; the clamping blades 190 are separated; the feed finger 262 is at the beginning of its working stroke; and the riderless portion of the chain 314 is passing beneath the elbow of the bell crank lever 318.

The first part to begin effective operation is the feed finger 262 which engages one or more projections P well back of the front end of the strip and then moves forward a distance substantially equal to the distance between successive projections. Such motion disposes the foremost projection over the tooth 86 on the anvil 74 with the V-notch in the front edge of the strip S pressing against the bead B of the tape. At the same time the second projection on the strip is disposed over the tooth 88 on the floating pad 82. These two teeth jointly coact with the strip to precisely locate the foremost element thereof immediately prior to a severing operation.

It will be noticed that during this forward feed of the strip the floating pad is at the upper limit of its travel, flush with the casing block 64, U-shaped spacing block 80, and anvil 74. However, due to the presence of the recess 122, the U-shaped spacing block 80 does not support the strip during forward movement thereof, and the rear corner 334 of the floating pad is, therefore, rounded to prevent marking, catching or buckling of the strip during forward feed arising from the chance presence of an indentation or projection on the lower surface of said strip.

Immediately after the strip has assumed its advanced position, the shearing die 146, which during the feeding of the strip has been moving down with its pilot posts disposed in the recesses 84, comes into contact with the upper surface of the strip behind the foremost projection. As the shearing die continues to move down, it urges the forward portion of said strip (except for the element E being sheared) against the floating pad 82 and forces said pad downwardly relative to the stationary anvil 74. At the bottom of the working stroke the die, the strip and floating pad assume the relative positions shown in Fig. 10. It will be appreciated that the presence of the recess 122 allows the strip to be deflected over a relatively long span and thereby prevents distortion.

The feed finger 262 is now retracted. Because said finger moves in a horizontal plane and since the strip is depressed, the finger will not engage or ride over the upper surface of said strip during its return stroke. This feature is utilized in stopping the feed of the strip S so to obtain empty spaces between successive groups of slide fastener elements on the tape. It will be recalled that when the spacing mechanism 30 is rendered operative by engagement of the riders 316 and the bell crank lever 318, the shearing die 146 is maintained at the bottom of its working stroke in the position shown in Fig. 10 while the feed finger 262 continues to operate. In this position said die keeps the forward end of the strip S depressed so that the feed finger can move back and forth without engaging or touching the strip to either advance or mutilate the same.

After the feed finger 262 has fully advanced the strip S, the portion of the strip, which is to be severed to provide a slide fastener element, has a forward face comprising a deep V-shaped groove or notch extending from one lateral edge of the strip to the other lateral edge thereof and terminating in two tips or points (Fig. 7). Said tips or points, after the feeding of the strip has been completed, lie on the anvil 74 and are disposed forwardly of the front face of the shearing die 146. Thus when said die descends and begins to form and shear an element from the strip, these tips project beyond said die. After the die has moved a short distance through the strip, but before it has fully severed the element therefrom, the clamp blades 190, which during descent of the shearing die have been moving towards each other, are in such position that the rounded corners 196 on the lower flanges 192 contact the exposed tips or points of the element being severed. Such contact turns the tips inwardly to partially embrace the bead B of the tape and lightly grasp the same. As the blades 190 continue to move towards each other, the flats 194 come into contact with the sides of said slide fastener element. At this time the severing has just been completed and the flats 194 are free to bend the sides of the jaws near the ends thereof inwardly toward the tape T (Fig. 13). These flats are relatively short since they must clear the front face of the reciprocating die 146 while it is severing an element, in order to allow the rounded corners 196 to turn in the tips of the element. Due to said shortness, if the flats 194 were permitted to fully clamp the freshly severed element on the tape, they would mutilate the sides thereof.

For this reason the flats 194 are not allowed to finish the clamping operation. However, after they have functioned, the element will be firmly but lightly clamped on the tape although it would not be able to pass through the slider with which it is designed to cooperate. This partially fastened element moves up as the tape is advanced until it reaches the level of the flanges 198. The latter compress the element to its proper width and tightly clamp same on the tape. At the same time, as mentioned earlier, they smooth and round off the sides and corners of the element.

It will be noted that the upper flanges 198 are much longer than the lower flanges 192 in order to act on the entire length of the slide fastener element. This length of the flanges 198 would cause them to interfere with the operation of the reciprocating shearing die 146 if it were not for the presence of cutouts 336 in said die at a point where the flanges 198 would otherwise butt against said die. These cutouts 336 are made longer than necessary for clearance in order to allow the shearing die to descend beyond the anvil and substantially depress the forward end of the strip and also to allow for grinding of the working face of said die.

It will be appreciated that it is difficult to exactly time the shearing and clamping dies, above described, at the high speeds (between 2,000 and 3,000 cycles per minute) at which the apparatus functions. It is almost impossible to achieve such accurate timing only by shaping and setting the cams 46 and 48, and it will thus be understood that the nice adjustments obtained by the adjusting screws 142 and 210 which enable the desired degree of precision to be secured in the timing are therefore highly essential to the practice of the invention.

It may be mentioned that the presence of the V-shaped groove 164 in the front face of the shearing die provides a passageway through which the tape T, with slide fasteners attached, may freely move vertically upwardly. If desired, the bead of the tape may be inclined slightly from the vertical by offsetting the axis of the pin 292 so that as the tape is advanced the slide fastener elements just attached will shift away from the shearing die.

The tape operating means 28 is so timed that it will advance the tape after the feed dog, the shearing die, and the clamping blades have all been retracted.

The apparatus may be easily disassembled in order to obtain access to parts which are quickly worn and, moreover, is so constructed that these parts need not be replaced after wear, but may be resharpened and reshaped and then put back into the machine for further use.

To disassemble the apparatus for sharpening and reshaping the shearing die 146 and the flanges 192 and 198 of the clamping blades 190, the clamp bolts 126 are loosened, the clamps 128 removed, the crosshead 132 slightly depressed, and the housing 62 lifted. The shearing die 146 will be raised with the housing. The clamping blades 190 will also be removed as a unit with the housing, since the operative connections between the channels 234 and the fingers 228 are automatically broken by vertical movement of the crossheads 208.

With the housing 62 removed, the clamp crossheads 208 may be displaced from their guides 206, the bolts 204 unscrewed and the clamping blades 190 thus freed for grinding. By making both flanges 192 and 198 of the clamping blades symmetrical, said blades may be reversed side for side and end for end when one side has been worn beyond regrinding. After grinding, the screws 210 are turned sufficiently to compensate for the metal removed.

The shearing die 146 can be removed by loosening the bolts holding the clamp plates 150 te the crosshead 132. When said die is reinserted, its alignment need not be retrued since it is received in the channel 148 which is maintained in predetermined position relative to the shearing anvil. The screw 142 is used to compensate for metal removed during grinding of the shearing die.

The shearing anvil 74 is as easily removed for resharpening. This is accomplished by taking out the bolts 106 (Fig. 6) after the housing 62 has been removed and permitting the clamps 102 to drop. The anvil is thus exposed on the front of the ridge 68 and can be picked out manually from the side of the apparatus not having a bell crank lever 172 for driving the shearing die. After grinding the top surface of the anvil 74, taller blocks 78 are used to replace the blocks employed before grinding and bring the ground surface of the anvil flush with the upper surface of the casing block 64. When replacing the clamps 102, the clamp fingers 104 are disposed against any exposed portion of the front face of the anvil 74 and spacing blocks 78.

It will thus be seen that there is provided an apparatus and a method of operating the same in which the several objects of the invention are accomplished and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described the invention, we claim as new and desire to secure by Letters Patent:

1. In an apparatus for severing slide fastener elements from a formed strip having straight longitudinal edges and for attaching said elements to a tape, and which elements have a pair of diverging jaws whose outer edges are formed from opposite longitudinal edges of the strip and whose inner edges are free of protuberances, the combination of means to advance said strip toward the tape as elements are successively severed therefrom, a stationary member to support a slide fastener element severed from the strip, a shearing member reciprocably movable relative to said stationary member for cooperation therewith to sear off a slide fastener element from the front of said strip with the tips of its jaws lying in front of said reciprocating member, clamp blades having means to engage the points of said tips to turn said tips inwardly at an angle to the sides of said jaws before said reciprocating member has fully sheared said slide fastener element from said strip and means to subsequently urge the jaws and the inturned tips against said tape.

2. In an apparatus for severing slide fastener elements from a formed strip and for attaching said elements to a tape, the combination of means for successively severing elements from said strip which have diverging jaws whose tips extend approximately parallel to the sides of the jaws, means linearly reciprocable at right angles to said tape for clamping said elements on said tape, said clamping means having portions adapted to engage the points of the tips of the jaws of said elements to inturn said tips at an angle to the sides of said jaws before said elements are fully severed from said strip and portions to engage in the jaws in back of the inturned tips to force the sides of the jaws of said elements against said bead after said tips have been inturned, said last named portions being juxtaposed to said severing means and pressing the sides of the jaws lightly against said tape, and means to tightly press said jaws against said tape, said last named means extending toward said strip further than said portions for engaging the sides of said jaws and being spaced from said portions longitudinally of said tape, said severing means being recessed to accommodate said last named means.

3. In an apparatus for severing slide fastener elements from a formed strip and for attaching said elements to a tape, in combination a bed, a housing, means to detachably secure said housing to said bed, cooperating means on said housing and said bed to position said housing and bed in permanently fixed, predetermined relative relationship, said housing containing a crosshead, means to sliding receive said crosshead in said housing, means to adjust the transverse position of said crosshead in said housing, a shearing die, and means to rigidly mount said shearing die on said crosshead.

4. In an apparatus for severing slide fastener elements from a formed strip and for attaching said elements to a tape, in combination, a bed, a housing, means to detachably secure said housing to said bed, cooperating means on said housing and said bed to position said housing and bed in predetermined relative relationship, said housing containing a crosshead, means to slidingly receive said crosshead in said housing, a shearing die, means to rigidly mount said shearing die on said crosshead, said housing having a channel running normal to the direction of reciprocation of said crosshead, a second crosshead, a clamping blade, and means to rigidly mount said clamping blade on said second named crosshead, said second crosshead being slidingly contained in said channel so that said shearing die, first named crosshead, clamping blade and second named crosshead are removable as a unit with said housing from said bed.

5. In an apparatus for severing slide fastener elements from a formed strip and for attaching said elements to a tape, in combination, a bed, a housing, cooperating means on said housing and said bed to position said housing and bed in predetermined relationship, an anvil supported in said bed, shearing means cooperating with said anvil and slidingly contained in said housing, means to detachably secure said housing to said bed, and clamping means slidingly contained in said housing so that said shearing means and said clamping means are removable as a unit with said housing from said bed.

6. In an apparatus for severing slide fastener elements from a formed strip and for attaching said elements to a tape, in combination, a bed, a housing, an anvil supported in said bed, shearing means slidingly supported in said housing, means to detachably secure said housing to said bed, cooperating means on said housing and said bed to position said housing and said bed in predetermined relative relationship, and means to drive said shearing means, said means comprising a member supported on said bed and a member slidingly supported on said housing, said members being operatively disposed in abutting relationship and being movable out of abutting relationship when said housing is removed from said bed to break the operative connection therebetween.

7. In an apparatus for severing slide fastener elements from a formed strip and for attaching said elements to a tape, in combination, a bed, a housing, means to detachably secure said housing to said bed, cooperating means on said housing and said bed to position said housing and bed in predetermined relative relationship, clamping means slidingly contained in said housing so that said housing and clamping means are removable as a unit from said bed, means to drive said clamping means, said driving means comprising a member mounted on said bed and a member slidingly supported on said housing, said members being operatively disposed in abutting relationship and being movable out of abutting relationship when said housing is removed from said bed whereby to break the operative connection therebetween.

8. In an apparatus for severing slide fastener elements from a formed strip and for attaching said elements to a tape, in combination, a bed, an anvil supported on said bed, a housing, means to detachably secure said housing to said bed, cooperating means on said housing and said bed to position said housing and bed in predetermined relative relationship, shearing means slidingly contained in said housing for cooperation with said anvil so that said housing and shearing means are removable as a unit from said bed, means to drive said shearing means, said driving means including a member mounted on said bed and a member slidingly supported on said housing, said members being operatively disposed in abutting relationship and being moved out of abutting relationship when said housing is removed from said bed whereby to break the operative connection between said members, clamping means slidingly contained in said housing so that said clamping means is likewise removable with said housing from said bed, means to drive said clamping means, said last named driving means including another member mounted on said bed, and another member slidingly supported on said housing, said last named pair of members being operatively disposed in abutting relationship and being moved out of abutment when said housing is removed from said bed whereby to break the operative connection between said last named pair of members.

9. In an apparatus for severing slide fastener elements from a formed strip and for attaching said elements to a tape, in combination, a bed, an anvil supported on said bed, a housing, means to detachably secure said housing to said bed, cooperating means on said housing and said bed to position said housing and said bed in predetermined relative relationship, shearing means supported on said housing and adapted to cooperate with said anvil, said shearing means comprising a crosshead reciprocably mounted in said housing, a shearing die detachably secured to said crosshead, guide means to set said shearing die on said crosshead in fixed position normal to the direction of movement of said crosshead, and means to laterally vary the position of said crosshead whereby, after said shearing die has been properly set relative to said anvil by adjustment of said last named means, said shearing die may be removed for replacement or repair and replaced on said crosshead without disturbing the alignment of said die and said anvil.

10. In an apparatus for severing slide fastener elements from a formed strip and for attaching said elements to a tape, in combination, a bed, a housing, means to detachably secure said housing to said bed, cooperating means on said housing and said bed to position said housing and said bed in predetermined relative relationship, a pair of clamping means slidingly contained in said housing so that said housing and clamping means are removable together as a unit from said bed, and means to oppositely reciprocate said clamping means, said reciprocating means comprising a pair of members mounted for oscillation on said bed, each of said members having an extension thereon, said extensions having rounded tips which are snugly received in channels in said clamping means, each said channels lying transversely of the direction of reciprocation of one of said clamping means and extending all the way to a side thereof facing an oscillating member whereby when said housing is removed from said bed, the operative driving connection between said extensions and said channels will be broken.

11. In an apparatus for severing slide fastener elements from a formed strip, in combination, a bed, a ridge on the upper face of said bed, a recess in the forward face of said ridge, an anvil disposed in said recess, means to back up said anvil, and means detachably secured on the forward face of said ridge for pressing said anvil against said backing means.

12. In an apparatus for severing slide fastener elements from a formed strip, in combination, a bed, a ridge on the upper face of said bed, a recess in the forward face of said ridge, an anvil disposed in said recess, means to back up said anvil, and means detachably secured on the forward face of said ridge for pressing said anvil against said backing means, said last named means comprising a rigid member overlying the front face of said ridge and having a finger portion in contact with the front face of said anvil, means to pivotally mount said rigid member on said front face, and adjusting means to rotate said pivotal member about a vertical axis parallel to the front face of said ridge.

13. In an apparatus for severing slide fastener elements from a formed strip, in combination, a bed, a recess in said bed, an anvil disposed in said recess, means to back up said anvil, said means including members movable relative to said bed and members fixed relative to said bed, and a base plate at the bottom of said recess beneath said anvil and said fixed and movable members for distributing the stress exerted upon said anvil.

14. In an apparatus for severing slide fastener elements from a formed strip, in combination, a bed, a recess in said bed, an anvil disposed in said recess, means to back up said anvil, said means including members movable relative to said bed and members fixed relative to said bed, and a base plate at the bottom of said recess beneath said anvil and said fixed and movable members for distributing the stress exerted upon said anvil, a portion of said base plate beneath said movable member being apertured to freely receive a depending portion of said movable member, said depending portion having a lateral extension below said base plate whereby said base plate limits the upward movement of said movable member.

15. In an apparatus for severing slide fastener elements from a formed strip, in combination, a bed, a recess in said bed, an anvil disposed in said recess, means to back up said anvil, said means including members movable relative to said bed and members fixed relative to said bed, a base plate at the bottom of said recess beneath said anvil and said fixed and movable members for distributing the stress exerted upon said anvil, a portion of said base plate beneath said movable member being apertured to freely receive a depending portion of said movable member, said depending portion having a lateral extension below said base plate whereby said base plate limits the upward movement of said movable member, and means to resiliently urge said movable member away from said base plate, said last named means including stop means whereby when said lateral extension abuts said base plate, said biasing means is rendered ineffective to further urge said movable member.

16. In an apparatus for severing slide fastener elements from a formed strip, in combination, an anvil comprising a pair of parallel posts interconnected by a portion disposed rearwardly of said posts, said portion and the adjacently disposed walls of said posts having an elongated keyshaped groove formed therein, a bed having a recess in which said anvil is received and a plurality of pairs of supporting blocks for said posts, each of said pairs of posts being of a different predetermined height whereby said anvil may be reduced in height during sharpening by fixed amounts and the top face of said anvil may be maintained in predetermined position by selecting one of said pairs of supporting blocks.

17. In an apparatus for severing slide fastener elements from formed strips, in combination, a bed, an anvil supported in said bed, a shearing die supported on said bed for slidable movement relative to said anvil, means to reciprocate said shearing die, means movable relative to said anvil for backing up said anvil, and adapted to be depressed upon reciprocation of said shearing means and having a nub on the surface facing said shearing means which cooperates with a depression in said strip behind the foremost depression therein for registering said strip relative to said anvil.

18. In an apparatus for severing slide fastener elements from a formed strip, in combination, a bed, an anvil rigidly mounted in said bed, means for backing said anvil, said last named means being movable relative to said anvil, shearing means mounted for sliding movement relative to said anvil, means for reciprocating said shearing means, said shearing means being adapted to depress said backing means on its working stroke, means to feed said strip toward said anvil, means to guide said strip feeding means for horizontal linear movement, and means to render said strip feeding means ineffective, said last named means comprising means to hold said shearing means at the end of its working stroke.

19. In an apparatus for severing slide fastener elements from a formed strip, in combination, a bed, an anvil rigidly mounted in said bed, means for backing said anvil, said last named means being movable relative to said anvil, shearing means mounted for sliding movement relative to said anvil, means for reciprocating said shearing means, said shearing means being adapted to depress said backing means on its working stroke, and means for intermittently feeding said strip toward said anvil, and adapted to be actuated only when said shearing means is retracted, means to guide said feed means so that the operative portion thereof moves horizontally and cooperates with the forward portion of said strip, and means to render said feed means ineffective, said last named means including means for holding said shearing means at the end of its working stroke whereby the forward end of the strip is depressed and out of contact with the operative portion of said shearing means.

20. A combination as set forth in claim 19 wherein means for holding said shearing means at the end of its working stroke comprises a member carried by said reciprocating means, a second member and means to resiliently urge said second member in the path of movement of said first member, said first member blocking the travel of said second member in all positions of said first member save when said shearing means nears the end of its working stroke.

21. A combination as set forth in claim 19 wherein means for holding said shearing means at the end of its working stroke comprises a member carried by said reciprocating means, a second member and means to resiliently urge said second member in the path of movement of said first member, said first member blocking the travel of said second member in all positions of said first member save when said shearing means nears the end of its working stroke, said resilient means including a pair of pivotally interconnected levers one near and one remote from said second member, one of said levers being rotatably mounted at a fixed point spaced from the pivot, a spring member to resiliently urge said levers angularly apart, and a bridging member having a portion thereof resting against said second member and a portion thereof resting against the lever remote from said second member, and means to urge said remote lever toward the lever near said second member.

22. In an apparatus for severing slide fastener elements from a formed strip, in combination, a bed, an anvil rigidly mounted in said bed, means for backing said anvil, said last named means being movable relative to said anvil, shearing means mounted for sliding movement relative to said anvil, means for reciprocating said shearing means, said shearing means being adapted to depress said backing means on its working stroke, and means to feed said strip toward said anvil, said means including a bell crank lever journalled beneath said bed and having an end thereof freely passing through and disposed above said bed, means to intermittently oscillate the other end of said bell crank lever, said first named end having a feed dog rotatably mounted thereon.

23. In an apparatus for severing slide fastener elements from a formed strip, in combination, a bed, an anvil rigidly mounted in said bed, means for backing said anvil, said last named means being movable relative to said anvil, shearing means mounted for sliding movement relative to said anvil, means for reciprocating said shearing means, said shearing means being adapted to depress said backing means on its working stroke, and means to feed said strip toward said anvil, said means including a bell crank lever journalled beneath said bed and having an end thereof freely passing through and disposed above said bed, means to oscillate the other end of said bell crank lever, a feed dog, and means to pivotally mount said feed dog on said first named lever end, said pivotal mounting means being eccentrically rotatable relative to said lever.

24. In an apparatus for severing slide fastener elements from a formed strip having straight longitudinal edges and for attaching said elements to the tape, the combination of means to make a cut in said strip near an end thereof from one longitudinal strip edge to the other, means to intermittently advance said strip longitudinally to said cutting means between successive operations thereof whereby said cuts will be made parallel to one another and form slide fastener elements having spread jaws, means operable to engage the points of the tips of the jaws of the slide fastener element which will be severed by such shearing operation and to inturn said tips at an angle to the sides of the jaws, means to actuate said shearing means and said inturning means in such timed relationship that effective operation of said inturning means is initiated before effective operation of said shearing means is completed so that the shanks of the jaws of a front element will be integrally connected with the material in the strip from which the jaws of the next succeeding element will be formed whereby the shanks of the jaws whose tips are being inturned will be unaltered by operation of said inturning means, and means to subsequently urge the jaws and the inturned tips against said tape.

25. A method for severing slide fastener elements from a formed strip having straight longitudinal edges and for attaching said elements to a tape comprising the steps of cutting said strip along deep parallel grooves extending between its two longitudinal edges so as to form slide fastener elements having spread jaws, inturning the tips of the jaws of the foremost slide fastener element while still a part of the strip, starting such inturning before cutting the foremost element away so that the shanks of the jaws of said foremost element are integrally connected with and supported by the material in the strip from which the jaws of the next succeeding element will be formed whereby the shanks of the jaws of the foremost element whose tips are being inturned will be unaltered by such inturning operation, and subsequently engaging the jaws in back of the inturned tips to press said jaws and the inturned tips against said tape.

26. In an apparatus for severing slide fastener elements from a formed strip having straight longitudinal edges and for attaching said elements to a tape and which elements have a pair of divergent jaws whose outer edges comprise short lengths of the opposite longitudinal edges of the strip and whose inner edges are free of protuberances, the combination of means to advance said strip toward the tape as elements are successively severed therefrom, a stationary member to support slide fastener elements severed from the strip, a shearing member reciprocally movable relative to said stationary member for cooperation therewith to successively shear off slide fastener elements from the front of said strip with the tips of their jaws lying in front of said reciprocating member, and means to engage the points of the tips to turn said tips inwardly at an angle to the sides of said jaws before said reciprocating member has fully sheared said elements from the strip and means to subsequently engage the jaws in back of the inturned tips to press the jaws and the inturned tips against said tape.

27. In an apparatus for severing slide fastener elements from a formed strip and for attaching said elements to a tape, the combination of means for successively severing elements from said strip which have divergent jaws whose tips extend approximately parallel to the sides of the jaws, means to engage the points of the tips to turn in said tips at an angle to the sides of said jaws, and means for subsequently engaging the jaws in back of the inturned tips to urge the sides of said jaws having said inturned tips toward said tape to clamp said elements on an edge thereof.

28. A method for severing slide fastener elements from a formed strip having straight longitudinal edges and attaching said elements to a tape, said method comprising the steps of successively making deep parallel cuts between the longitudinal edges of said strip whereby to form and sever slide fastener elements having pairs of diverging jaws whose outer edges are formed from opposite longitudinal edges of the strip and whose inner edges are free of protuberances, inturning the tips of the jaws of the foremost elements at an angle to the sides of said jaws before they are formed by severance from the strip, and then bending in the jaws having the inturned tips into holding engagement with said tape.

MORRIS NORKIN.
ABRAHAM SAVITZKY.